(No Model.)

C. J. HILL.
NUT LOCK.

No. 435,832. Patented Sept. 2, 1890.

WITNESSES:
J. A. E. Criswell
C. Sedgwick

INVENTOR:
C. J. Hill
BY
Munn & Co.
ATTORNEYS

THE NORRIS PETERS CO., PHOTO-LITHO., WASHINGTON, D. C.

UNITED STATES PATENT OFFICE.

CHARLES JUNIUS HILL, OF PAVILION, NEW YORK.

NUT-LOCK.

SPECIFICATION forming part of Letters Patent No. 435,832, dated September 2, 1890.

Application filed January 30, 1890. Serial No. 338,648. (No model.)

*To all whom it may concern:*

Be it known that I, CHARLES JUNIUS HILL, of Pavilion, (Le Roy post-office,) in the county of Genesee and State of New York, have invented a new and Improved Nut-Lock, of which the following is a full, clear, and exact description.

My invention relates to improvements in nut-locks; and the object of my invention is to provide a simple, convenient, and positive device that will prevent a nut from turning upon a bolt, and that may be applied to all kinds of wood and metal work.

To this end my invention consists in a nut having radial grooves upon its inner face and a washer having a groove formed therein, so that the back of wall of the groove will engage a corresponding groove in the wood or metal to which it is applied, and a wire spring projecting from said groove so as to engage the grooves of the nut and prevent the same from turning, said washer being also provided with a suitable catch, which may engage the lock-spring and prevent it from engaging the nut. This construction will be hereinafter fully described, and specifically pointed out in the claims.

Reference is to be had to the accompanying drawings, forming a part of this specification, in which similar letters of reference indicate corresponding parts in all the figures.

Figure 1:
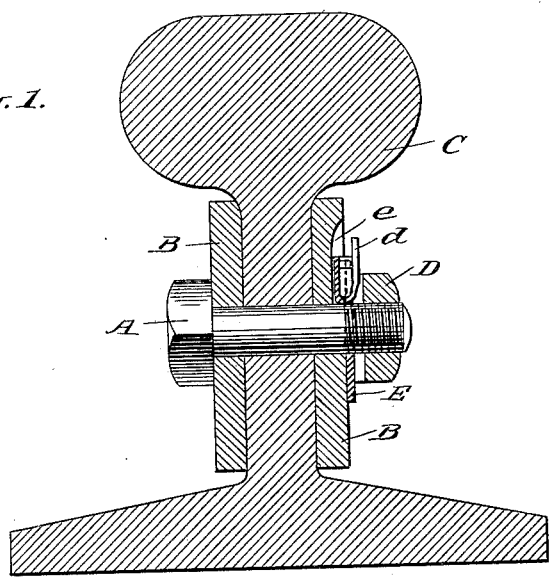
Figure 2:
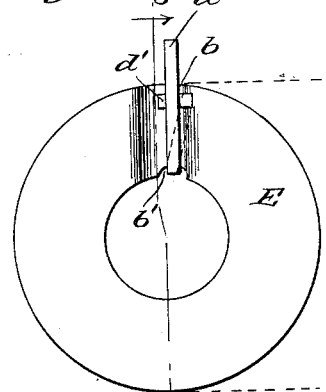
Figure 3:
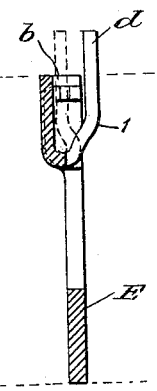
Figure 4:
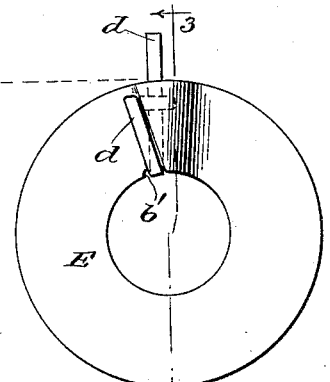
Figure 5:
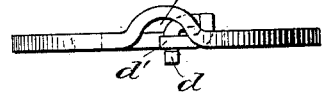
Figure 6:
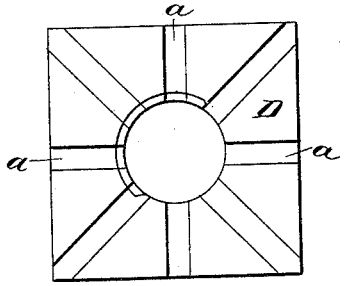
Figure 7:
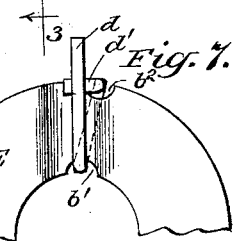

Figure 1 is a vertical cross-section of a rail provided with a bolt to attach the fish-plate thereto, said bolt being provided with a nut-lock embodying my invention. Fig. 2 is a front elevation of the washer provided with a locking-spring. Fig. 3 is a transverse section of the same on the line 3 3 of Figs. 3 and 4. Fig. 4 is a rear elevation of the same. Fig. 5 is a plan of the same, looking upon the locking-spring and washer-groove. Fig. 6 is a rear elevation of the nut, showing the radial grooves therein, and Fig. 7 is a broken front elevation of a modified form of the hook and washer.

I have shown my invention as applied to a bolt A by which the fish-plates B are attached to a rail C, as the invention is easily shown in such application, but it may be used in connection with a bolt and nut upon all classes of work.

The bolt A is of the usual construction, and the nut D, which fits thereon, is like an ordinary nut, except that its inner face is provided with radial grooves $a$, which extend from the hole in the center of the nut to the edges thereof. The nut may be provided with any desired number of these grooves, which will depend upon the nature of the work in which it is to be used.

The washer E is placed over or upon the bolt in the usual manner, and is provided with a groove $b$, which extends from the bolt-hole in the center of the washer to one edge thereof, and which is pressed or formed from the body of the washer, so as to project from the face of the same. The washer is provided with a spring-wire $d$, made preferably of flat steel wire, which is partially incased by the groove $b$ and one end of which extends beyond the edge of the washer. One end $d'$ of the spring $d$ extends through a hole in the washer from the rear side thereof, and is bent so as to extend partially across the groove $b$ near the outer edge of the washer. The wire $d$ extends along the side of the groove $b$ upon the back side of the washer, and is bent so as to extend up through the niche $b'$ at the inner end of the groove $b$ to the front side of the washer. It then extends outwardly above and in line with the groove $b$ to a point beyond the edge of the washer. After being brought to the front of the washer the spring $d$ is bent outwardly at the point $l$, so that it will remain in that position unless pressed into the groove $b$ and under the bent end $d'$, which forms a catch to hold the spring. The niche $b'$ at the inner end of the groove $b$ is to prevent the wire $d$ from extending into the bolt-hole of the washer and interfering with the bolt.

The washer E is placed upon the bolt so that the wall of the groove $b$ will project into a corresponding groove, as $e$, in the fish-plate B, which has been formed in the wood or metal to which it is attached to receive it. The washer will thus be prevented from turning, and the spring $d$ will project from the face thereof, as shown in Fig. 3. The nut D is then turned upon the bolt, and the spring $d$ will catch in one of the radial grooves $a$ of the nut and hold it firmly in position. When the nut is to be removed, the spring $d$ is pressed into the groove $b$ of the washer and beneath the catch $d'$. It will thus be held below the front surface of the washer, and the nut may be freely turned upon the bolt. If the nut is to be turned tightly upon the bolt the spring $d$ may be retained beneath the catch $d'$ until the nut is turned home, when it may be released, so as to engage a groove of the nut and hold the same in place.

In Fig. 7 I have shown a modification of the device, the washer E having a niche $b^2$ upon its outer edge at the end of the groove $b$, similar in shape to the niche $b'$, and the hook $d'$ being turned up through said niche instead of passing through a hole in the washer. The device works in every way like the one already described, and needs no detailed description.

Having thus described my invention, I claim as new and desire to secure by Letters Patent—

1. A nut-lock consisting, essentially, of a washer having a radial groove pressed from the body thereof, so that the wall of the groove will engage a similar groove in the material upon which it is placed to prevent the washer from turning, and a spring-wire having one end projecting through the wall of the washer-groove to form a catch, the body of the spring extending alongside the groove upon the back of the washer, and being bent so as to extend opposite the groove upon the front side of the washer, so that said spring may be depressed and held by the catch in the groove, or may project from the face of the washer so as to engage a groove upon the inner face of a nut, substantially as described.

2. The combination, with the washer E, having the groove $b$ formed upon the body thereof, as shown, and the spring $d$, having an end $d'$ formed into a catch to retain the spring in the groove $b$, of the nut D, adapted to be screwed upon a bolt and having radial grooves $a$ in the inner face thereof to engage the spring $d$ and prevent the nut from turning, substantially as described.

CHARLES JUNIUS HILL.

Witnesses:
CHAS. W. SHEPARD,
W. M. CHAPMAN.